United States Patent [19]

Andō et al.

[11] Patent Number: 4,641,023

[45] Date of Patent: Feb. 3, 1987

[54] OPTICAL HEAD

[75] Inventors: Hideo Ando; Akihiko Doi, both of Tokyo, Japan

[73] Assignees: Kabushiki Kaisha Toshiba; Toshiba Automation Equipment Engineering, Ltd., both of Kawasaki, Japan

[21] Appl. No.: 671,909

[22] Filed: Nov. 16, 1984

[30] Foreign Application Priority Data

Nov. 16, 1983 [JP] Japan ............................ 58-215837
Dec. 1, 1983 [JP] Japan ............................ 58-227526
Mar. 29, 1984 [JP] Japan ............................ 59-61878

[51] Int. Cl.⁴ ........................... H01J 3/14; G02B 7/02
[52] U.S. Cl. .................................... 250/216; 350/255
[58] Field of Search ............... 250/216; 350/252, 253, 350/255

[56] References Cited

U.S. PATENT DOCUMENTS 2,533,478  12/1950  Lee et al. ............................ 350/253
4,236,790  12/1980  Smith ................................. 350/253
4,431,267  2/1984   Finck et al. ....................... 350/252

FOREIGN PATENT DOCUMENTS 339895  8/1921  Fed. Rep. of Germany .

Primary Examiner—Gene Wan
Attorney, Agent, or Firm—Cushman, Darby & Cushman

[57] ABSTRACT

In an optical head, a semiconductor laser is supported on a base and the base is secured to a hollow frame. A lens-barrel for supporting collimator lens system is disposed in the hollow frame so that the collimator lens system is faced to the semiconductor laser. The frame and lens-barrel are secured in point contact securement to each other by studs screwed in dies provided on the frame. The base, lens-barrel and frame are made of materials having linear expansion coefficients satisfying either one of inequalities $\alpha \geq \gamma \geq \beta$ and $\beta > \gamma > \alpha$, where $\alpha$, $\beta$ and $\gamma$ are linear expansion coefficients of the base, frame and lens-barrel respectively.

22 Claims, 10 Drawing Figures

F I G. 2
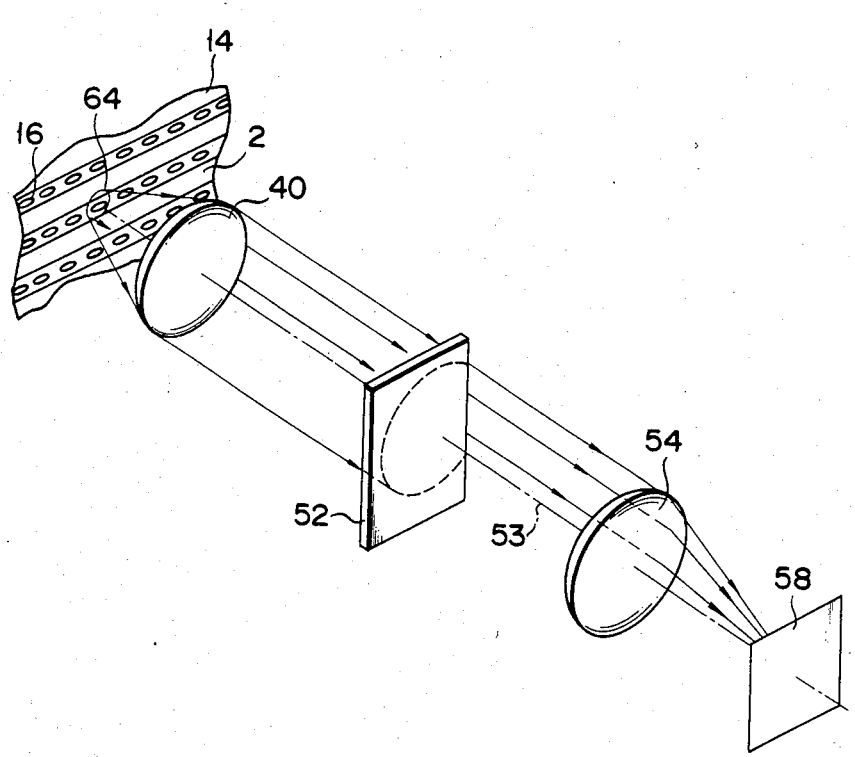

OPTICAL HEAD

BACKGROUND OF THE INVENTION

This invention relates to an optical head in which a light beam for reading, writing or erasing information is converged on an information recording medium such as an optical disk.

In the usual optical head the beam waist of a convergent light beam has to be formed on a light-reflecting surface or recording surface of the information recording medium, i.e., optical disk, when writing information on the disk, reading information therefrom or erasing information thereon. To this end, the optical head is provided with a focus servo control system for focus control such that the beam waist of a light beam is always held on the light-reflecting surface or recording surface of the optical disk. In such a focus servo optical system, particularly the optical system disclosed in the U.S. patent application Ser. No. 399,872 filed in July, 1982, now U.S. Pat. No. 4,516,331 which adopts a so-called knife edge process of detecting focus from the movement of a beam spot formed on the surface of a light detector provided in an image formation plane, on which an image concerning a light-reflecting surface or recording surface of an optical disk is formed, departure of the beam waist of a convergent beam from the light-reflecting surface or recording surface of the optical disk is liable to result from even a slight error of the length of the light path of the light beam or a slight error of the axis of the optical system that would be caused by changes in environmental conditions, particularly ambient temperature changes.

SUMMARY OF THE INVENTION

An object of the invention is to provide an optical head with an optical system which is less subject to the error of optical axis and change in the light path length with ambient temperature changes.

According to the invention, there is provided an optical head, which comprises a beam source for generating a light beam, a base supporting the beam source mounted thereon and having a linear expansion coefficient $\alpha$, a frame supporting the base secured thereto and having a linear expansion coefficient $\gamma$, a lens-barrel disposed in the frame and secured to the frame and having a linear expansion coefficient $\beta$, and a collimator lens system disposed in and secured to the lens-barrel for collimating the light beam generated from the beam source, wherein the frame is made of a material having a linear expansion coefficient satisfying either one of inequalities $\alpha \geq \gamma$ and $\beta > \gamma$.

According to the invention there is also provided an optical head for focusing a light beam onto a light reflecting surface, which comprises a beam source for generating a light beam, a base supporting the beam source mounted thereon and having a linear expansion coefficient $\alpha$, a frame secured to the base and having a linear expansion coefficient $\gamma$, a lens-barrel disposed in and secured to the frame and having a linear expansion coefficient $\beta$, a collimator lens system disposed in and secured to the frame for collimiating the light beam generated from the beam source, and an objective lens for converging the collimated light beam to form a beam spot on a light-reflecting surface, the beam source and light-reflecting surface being held in an image focusing relation to each other by an optical system provided between the beam source and the light-reflecting surface, wherein the frame is made of a material having a linear expansion coefficient satisfying either one of inequalities $\alpha \geq \gamma$ and $\beta > \gamma$.

According to the invention, there is further provided an optical head, which comprises a beam source for generating a light beam, a first base supporting the beam source mounted thereon and having a linear expansion coefficient $\alpha$, a frame supporting the first base secured thereto and having a linear expansion coefficient $\gamma$, a first lens-barrel disposed in and secured to the frame and having a linear expansion coefficient $\beta$, a collimator lens system secured to the first lens-barrel and having a focal distance for collimating the light beam generated from the beam source, an objective lens for converging the collimated light beam to form a beam spot on a light-reflecting surface, a photo detector for detecting defocus by detecting the light beam from the projecting lens, a second base supporting the light detector mounted thereon, and a second lens-barrel secured to the second base and accommodating the light detector and projecting lens which face each other and having a fixed linear expansion coefficient $\chi$, wherein the second lens-barrel is made of a material permitting cancellation of the defocus due to thermal deformation of the frame and first lens-barrel by the defocus due to thermal deformation of the second lens-barrel.

BRIEF DESCRIPTION OF THE DRAWINGS

FIG. 2 is a simplified perspective view showing an optical system in the optical head shown in FIG. 1;

DETAILED DESCRIPTION OF THE PREFERRED EMBODIMENT

Figure 1:
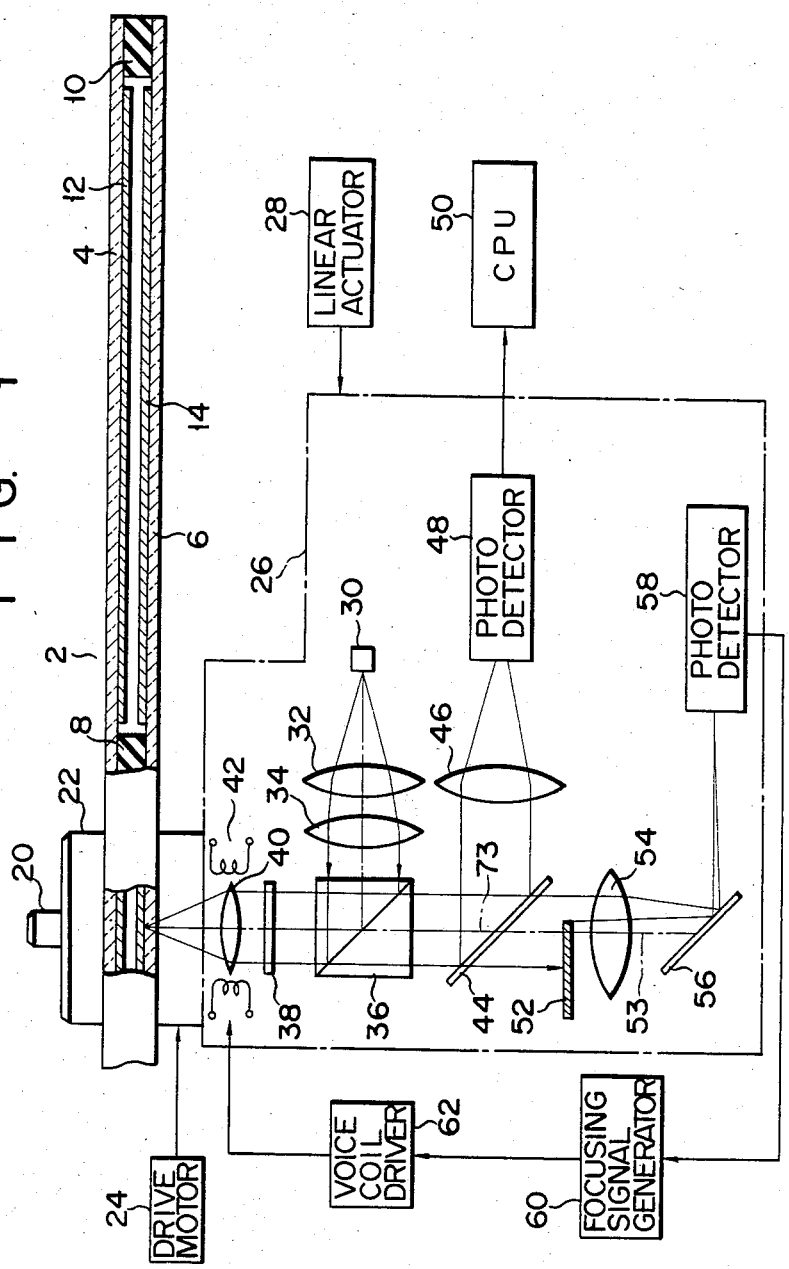
FIG. 1 is a schematic representation of one embodiment of the optical head according to the invention.

Now, an embodiment of the invention will be described with reference to the drawings. FIG. 1 shows an information recording and reproducing apparatus employing an optical head according to the invention. Reference numeral 2 designates an optical disk as an information recording medium. The optical disk 2 has a pair of transparent disks 4 and 6 bonded to the opposite sides of inner and outer spacers 8 and 10. Light-reflecting layers 12 and 14, which serve as information recording layers, are formed by deposition on the inner surfaces of the transparent disks 4 and 6. The light-reflecting layers 12 and 14 each have a helical tracking guide 16 formed on the surface. Information is recorded in the form of pits on the tracking guide 16. The optical disk 2 has a central hole. When the optical disk 2 is mounted on a turntable 18, its center spindle 20 is inserted into the center hole of the optical disk 2, whereby the axes of rotation of the turntable 18 and optical disk 2 are aligned. The turntable 18 is rotatably supported on a support (not shown) and rotated at a constant speed by a drive motor 24.

An optical head is shown, generally designated by 26. It is movable in the radial direction of the optial disk 2 by a linear actuator 28 or a rotary arm. A semiconductor laser 30 is accommodated in the optical head 26 as a source of a laser beam. When writing information on the optical disk 2, a laser beam with the light intensity thereof modulated according to the information to be written is generated from the semiconductor laser 30. When reading out the information from the optical disk 2, a laser beam having a constant light intensity is generated from the semiconductor laser 30. A divergent laser beam that is generated from the semiconductor laser 30 is converted by collimator lenses 32 and 34 into a parallel beam directed to a polarization beam splitter 36. The parallel laser beam reflected by the polarization beam splitter 36 is transmitted through a quarter wavelength plate 38 to be incident on an objective lens 40. The objective lens 40 converges the incident beam toward the light-reflecting layer 14 of the optical disk 2. It is supported such that it can be displaced in the direction of its axis by a coil 42. When the objective lens is brought to a predetermined position, the beam waist of the convergent laser beam from the objective lens 40 is projected on the surface of the light-reflecting layer 14, that is, a minimum diameter beam spot is formed on the surface of the light-reflecting layer 14. In this state, the objective lens 40 is in a focused state and ready for writing or reading information. To write information, pits are formed on the tracking guide 16 of the light-reflecting layer 14 by the light intensity modulated laser beam. On the other hand, to read information the constant light intensity laser beam is light intensity modulated as it is reflected by the pits formed on the tracking guide 16.

When the objective lens 40 is focused, the divergent laser beam reflected from the light-reflecting layer 14 of the optical disk 2 is converted through the objective lens 40 into a parallel beam and is transmitted through the quarter wavelength plate 38 to return to the polarizing beam splitter 36. As the laser beam is transmitted forwards and backwards through the quarter wavelength plate 38, the polarization plane of the laser beam is rotated 90 degrees, compared to the laser beam immediately after reflection by the polarization beam splitter 36. The laser beam whose polarization plane is rotated by 90 degrees is not reflected by but is transmitted through the polarization beam splitter 36. The laser beam transmitted through the polarization beam splitter 36 is split by a half mirror 44. One of the split beams is directed through a convex lens 46 to a first light detector 48. The first light detector 48 generates a first detection signal which contains information recorded on the optical disk 2. The first detection signal is fed to a signal processor for conversion to digital data. The other split beam from the half mirror 44 is directed to a partial light-blocking member 52, which transmits only a portion of the incident laser beam separated from an optical axis 53. The beam from the partial light-blocking member 52 is traveled through a projecting lens 54 to a mirror 56 and then to a second light detector 58. A prism, an apertured slit, a knife edge, etc. may be used instead of the light-blocking member 52. The second light detector 58 generates a second detection signal which is fed to a focus signal generator 60. The focus signal generator 60 generates a focus signal which is fed to a coil driver 62. The coil driver 62 drives the coil 42 according to the focus signal to maintain the objective lens 40 focused. For the accurate tracing of the tracking guide 16 that is formed on the light-reflecting layer 14 on the optical disk 2, a linear actuator 28 may be operated through processing the signal from the second light detector 28. Alternatively, the objective lens 40 may be displaced laterally. As a further alternative, a galvanometric mirror (not shown) may be operated.

Figure 3A:
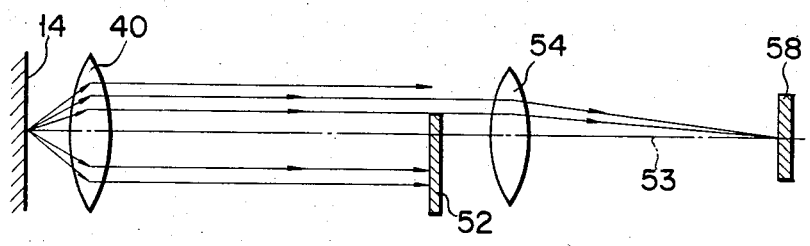
FIGS. 3A to 3C are views illustrating the principles of focus detection in the embodiment of the optical head according to the invention.
Figure 3B:
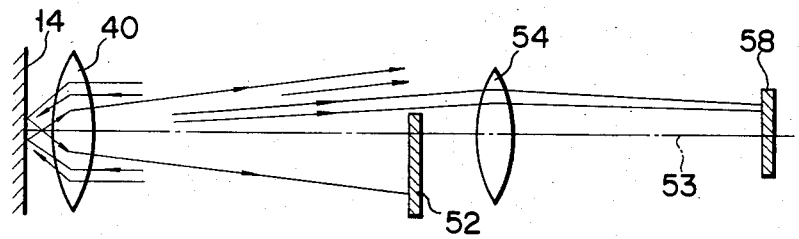
Figure 3C:
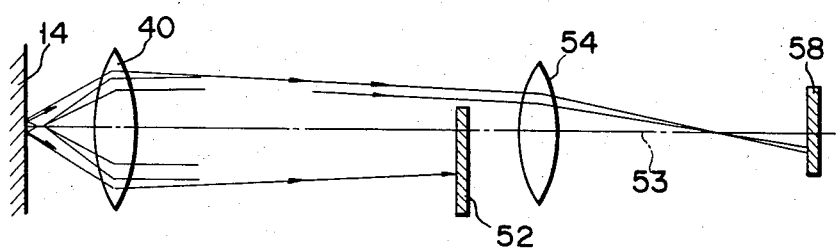

The optical system for detecting the focus shown in FIG. 1 is shown in a simplified form in FIG. 2. FIGS. 3A to 3C show orbits of the laser beam concerning the focus detection. When the objective lens 40 is in focus, the beam waist, i.e., the minimum beam spot 64, is formed on the surface of the light-reflecting layer 14. The laser beam that is incident on the objective lens 40 from the semiconductor laser 30 is usually a parallel beam, so that the beam waist is formed on the focal point of the objective lens 40. However, when the laser beam incident on the objective lens 40 from the laser 30 is slightly divergent or convergent, the beam waist is formed in the vicinity of the focal point of the lens 40. In the optical system shown in FIGS. 1, 2 and 3A to 3C, a beam waist is formed on the light incidence surface of the light detector 58 in the focused state of the objective lens 40. That is, in the focused state, the image of the beam waist 64 is formed on the center of the light incidence surface of the light detector 58.

When the beam waist 64 is formed on the light-reflecting layer 14 as shown in FIG. 3A, the laser beam reflected by the light-reflecting layer 14 is converted through the objective lens 40 into a parallel beam directed to the partial light-blocking member 52. The portion of the laser beam separated from the optical axis 53 and transmitted through the partial light-blocking member 52 is converged through the projecting lens 54 to be incident as the minimum spot, i.e., beam waist image, on the light incidence surface of the light detector 58. When the objective lens 40 is brought closer to the light-reflecting layer 14, the beam waist is formed at a position between the objective lens 40 and light-reflecting layer 14 which reflects the laser beam, as shown in FIG. 3B. In such defocusing state, the beam waist is usually formed within the focal distance of the objective lens 40. Therefore, the laser beam reflected by the light-reflecting layer 14 and incident on the objective lens 40 is converted by the lens 40 into a divergent laser beam, as is obvious from the assumption that the beam waist functions as a light spot. The portion of the laser beam transmitted through the partial light-blocking member 52 is again diverged. Therefore, the minimum spot of the beam converged by the projecting lens 54 is formed not on the light incidence surface of the light detector 58 but on a remoter point than the light detector 58. More specifically, the laser beam portion is incident on a portion of the light incidence surface of the light detector 58 above the center thereof as shown in FIG. 3B, and a greater beam pattern than the beam waist image is formed on the light incidence surface. When the objective lens 40 is separated from the light-reflecting layer 14, the laser beam is reflected by the light-reflecting layer 14 after forming a beam waist, as shown in FIG. 3C. In this defocused state, the beam waist is formed outside the focal point of the objective lens 40 and between the lens 40 and light-reflecting layer 14. Therefore, the reflected laser beam directed from the objective lens 40 toward the partial light-blocking member 52 is converged. The portion of the laser beam thus transmitted through the partial light-blocking member 52 is further converged to form a beam waist before it is incident on the light incidence surface of the light detector 58. Thus, a beam pattern greater than the beam waist image is formed on the portion of the light incidence surface of the light detector 58 below the center thereof as shown in FIG. 3C.

The optical head described above requires highly precise positioning and axial alignment of optical elements, which are important for an adequately focused servo system. Particularly, the positioning and axial alignment of the semiconductor laser 30, which serves as the laser beam source, is very important for providing for an adequately focused servo action. This is so because if the beam generating point of the semiconductor laser 30 is deviated even slightly from the optical axis of the optical system, the generated laser beam would move out of its proper direction, resulting in failure of the normal operation of the optical system for the focus detection. If the beam generating point of the semiconductor laser 30 is deviated even slightly from a predetermined point along the optical axis of the optical system, the beam which is to be converted into a parallel beam by the collimator lenses 32 and 34 would be converted into a divergent or convergent beam by these lenses. Particularly, with an optical system for focus detection, in which an image of the light-reflecting layer 14 of the optical disk is formed on the light detector 58 and a laser beam reflected from the light-reflecting surface of the optical disk is detected, even a slight deviation of the beam generating point of the semiconductor layer 30 along the optical axis would cause a comparatively great deviation of the beam spot on the light detector 58. Generally, the optical elements of the optical head are very precisely positioned and axially aligned when the head is assembled. However, these optical elements are liable to move out of the accurate position and axial alignment with changes in environmental conditions, particularly a change in temperature.

Figure 4:
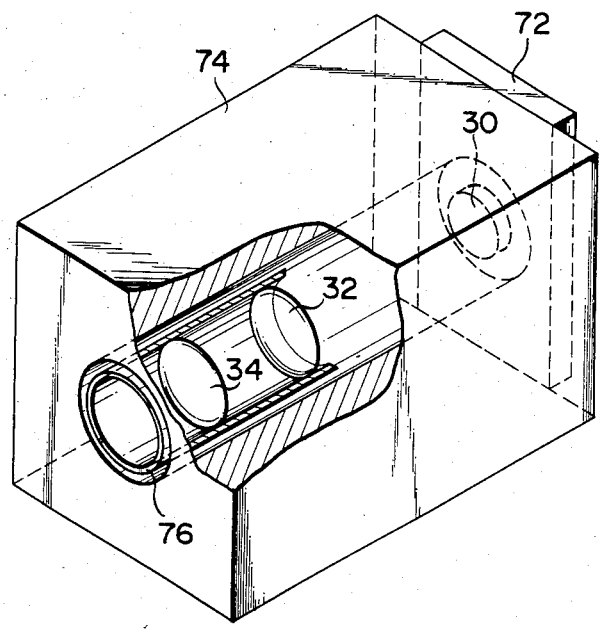
FIG. 4 is a fragmentary perspective view showing a structure for supporting a collimator lens system.
Figure 5:
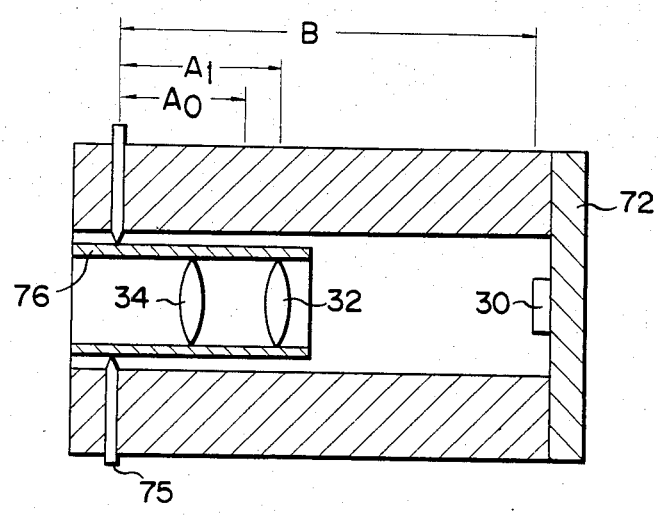
FIG. 5 is a sectional view showing the structure shown in FIG. 4.
Figure 6:
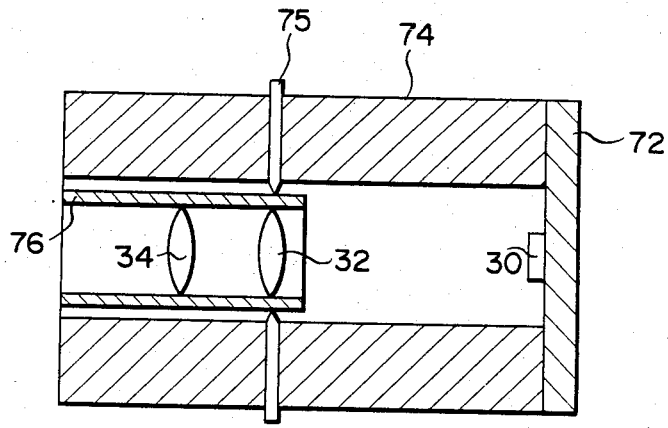
FIG. 6 is a sectional view showing a structure for supporting a collimator lens system in a modification of the embodiment.

To cope with such departure from the accurate position and axial alignment due to changes in environmental conditions, particularly with the deviation of the beam generating point of the semiconductor laser 30, the invention adopts a structure, which can hold the deviation within a tolerance. More specifically, as shown in FIG. 4, the semiconductor laser 30 is secured to a base 72. The base 72 is secured to a frame 74 such that the beam generation point of the semiconductor laser 30 is located on an axis of the frame 74. The collimator lenses 32 and 34 are secured to a lens-barrel 76 which is disposed in the frame 74. The frame 74 and lens-barrel 76 are secured in point contact securement to each other by studs 75 screwed in dies provided on the frame 74, as shown in FIG. 5, such that the axes of the collimator lenses 32 and 34 coincide with the axis of the frame 74. Preferably, as shown in FIG. 6, an outer periphery portion of the lens-barrel 76 that corresponds to the periphery of the collimator lens 32, which is disposed near the semiconductor laser 30, is secured to the frame 74 by one or more studs 75. The outer periphery portion of the lens-barrel 76, corresponding to the outer periphery of the collimator lens 32 disposed near the semiconductor laser 30, may be secured to the frame by an adhesive instead of the studs 75.

The base 72, lens-barrel 76 and frame 74 are made of materials having respective linear expansion coefficients $\alpha$, $\beta$ and $\gamma$ which satisfy either inequality $\alpha \geq \gamma \geq \beta$ or $\beta > \gamma > \alpha$. In other words, the thermal expansion coefficient of the frame 74 is set to be at least equal to the thermal expansion coefficient of either the base 72 or lens-barrel 76 or between the thermal expansion coefficients of the base 72 and lens-barrel 76. For example, the frame 74 is made of the same material as that of either the base 72 or lens-barrel 74. As a more specific example, the frame 74 is made of brass like the base 72, while the lens-barrel 76 is made of aluminum. In this case, the thermal expansion coefficient of the frame 74 is either equal to or approximately equal to the thermal expansion coefficient of the lens-barrel 76.

Selecting the materials for the base 72, frame 74 and lens-barrel 76, as noted above, can prevent deviation of the beam generating point of the semiconductor laser 30 from the axis of the collimator lenses 32 and 34. By so doing, it is also possible to maintain substantially a constant distance between the front focal point of the collimator lens system, including the collimator lenses 32 and 34 and the semiconductor laser 30, irrespective of the thermal expansion of the base 72, frame 74 and lens-barrel 76. Thus, it is possible to prevent misjudging the focusing state for defocusing state or vice versa in the focus detecting lens system.

For example, where the base 72 and frame 74 are made of brass, a change in the ambient temperature will cause no strain between the base 72 and frame 74 for their thermal expansion coefficients are equal. Thus, it is possible to prevent departure of the beam generation point of the semiconductor layer 30 from the axis of the collimator lenses 32 and 34. Where the frame 74 and lens-barrel 76 are made of the same material, a change in the ambient temperature will cause their thermal expansion or contraction substantially to the same extent. Thus, the distance between the front focal point of the collimator lens system and the semiconductor laser 30 may be held substantially constant within a tolerance. Further, with the point contact securement of the outer periphery portion of the lens-barrel 76, which corresponds to the outer periphery of the collimator lens 32 disposed close to the semiconductor layer 30, to the frame 74 by one or more studs 75, the thermal expansion or contraction of the lens-barrel 76 will not cause substantial deviation of the collimator lenses 32 and 34. Thus, the distance between the front focal point of the collimator lens system and semiconductor laser 30 may be held more constant within a tolerance.

The relation between the deviation due to thermal expansion or contraction and tolerance will now be discussed. Where a given outer periphery portion of the lens-barrel 76 is secured by point contact securement by one or more studs 75 to the frame 74 as shown in FIG. 5, the distance X1 from the front principle point of the collimator lens system, consisting of the collimator lenses 32 and 34, to the semiconductor layer 30 is given as:

$$X1 = B - A0,$$

where A0 represents the distance from the point of the lens-barrel 76 in contact with the stud or studs 75 to the front principle point of the collimator lens system, and B represents the distance from the aforesaid contact point of the lens-barrel 76 to the semiconductor laser 30. When an ambient temperature change of $\Delta t°$ occurs, the frame 74 and lens-barrel 76 undergo thermal expansion or contraction with respect to the afore-said contact point of the lens-barrel 76. Assuming that the distance from the front principle point of the collimator lens system to the semiconductor laser 30 is changed from X1 to X2 due to the thermal expansion or contraction, the distance X2 is given as:

$$X2 = B \times (1 + \gamma \times \Delta t) - A0 \times (1 + \beta \times \Delta t) \quad (1),$$

where $\beta$ and $\gamma$ are linear expansion coefficients of the materials of the lens-barrel 76 and frame 74, respectively. The change $|\Delta X|$ ($|\Delta X| = |X2 - X1|$) in the distance from the front principle point of the collimator lens system to the semiconductor laser 30 is given as:

$$|\Delta X| = |(B \times \gamma - A0 \times \beta) \times \Delta t| \quad (2).$$

In the above equation, the deviation of the collimator lens system consisting of the collimator lenses 32 and 34 with respect to the front principle point of the collimator lens system is very small. For this reason, the position of the collimator lens 32, which is disposed nearer the semiconductor laser 30, may be made a reference point in lieu of the front principle point of the collimator lens system. In this case, denoting the distance from the position of the collimator lens 32 shown in FIG. 5 to the semiconductor laser 30 by A1, we can have a similar equation to equation 2, namely:

$$|\Delta X| = |(B \times \gamma - A1 \times \beta) \times \Delta t| \quad (3).$$

Where the outer periphery portion of the lens-barrel 76 corresponding to the outer periphery of the collimator lens 32 disposed nearer the semiconductor laser 30 is secured by one or more studs 75 to the frame 74, the change in the distance from the point of the lens-barrel 76 in contact with the stud or studs 75 to the semiconductor laser 30 can be obtained as follows.

When a temperature change of $\Delta t°$ occurs, the frame 74 and lens-barrel 76 are thermally expanded or contracted with respect to the afore-said contact point of the lens-barrel 76. The thermal expansion or contraction of the lens-barrel 76 has no influence on the distance C from the afore-said contact point of the lens-barrel 76 to the semiconductor laser 30, but only the thermal expansion or contraction of the frame 74 has influence on the distance C. The change $|\Delta X|$ in the distance C caused due to the thermal expansion or contraction of the frame 74 is given as:

$$|\Delta X| = |\gamma C \times \Delta t| \quad (4).$$

Equation 4 holds when A1=0 and B=C are substituted into equation 3.

When the value of $|\Delta X|$ is increased, the laser beam from the collimator lens system, including of the collimator lenses 32 and 34, is no longer a parallel beam but is a divergent or convergent beam. The beam is divergent if $\Delta X$ is negative, while it is convergent if $\Delta X$ is positive. The extent of divergence or convergence is increased with increasing value of $|\Delta X|$. Therefore, an increase of the value of $|\Delta X|$ is liable to cause misjudgement of the focused state as a defocusing state or vice versa in the focus detection lens system. For this reason, a condition $|\Delta X| = 0$ should be met as much as possible, that is, the materials of the base 72, frame 74 and lens-barrel 76 are preferably selected to meet the condition noted above. Actually, however, it is impossible to perfectly meet the condition, and the materials and shapes of the base 72, frame 74 and lens-barrrel 76 are selected to hold the value of $|\Delta X|$ within a tolerance corresponding to a permissible defocusing value.

The permissible defocusing state will now be considered.

It is assumed that the objective lens 40 is an ideal lens free from aberration and converges an incident parallel laser beam having a spacially uniform light intensity distribution to form a minimum beam spot. The size a1 of this beam spot is given as:

$$a1 = 0.82 \, \lambda / NA \quad (5),$$

where NA is the numerical aperture of the lens.

Assuming that the spacial light intensity distribution of the laser beam is analogous to the Gaussian distribution and has the radius of $\omega_o$ where the light intensity is $1/e^2$ of the center light intensity, and the radius $\omega(Z)$ of the beam separated by Z along the optical axis is $$\omega(Z) = \omega_o \sqrt{1 + \left(\frac{\lambda Z}{\pi \omega_o^2}\right)^2}$$

The radius $\omega(Z)$ of the beam on the light-reflecting layer in the case of defocusing of Z is expressed using the above equation as:

$$\omega^2(Z) = \omega_o^2 \left\{ 1 + \left(\frac{\lambda Z}{\pi \omega_o^2}\right)^2 \right\}$$

$$= \omega_o^2 \left\{ 1 + \left(\frac{(NA)^2}{0.17 \, \pi \lambda}\right)^2 Z^2 \right\}$$

The center light intensity at this time is:

$$I = \left(\frac{\omega_o}{\omega(Z)}\right)^2$$

The minimum center light intensity $I_{min}$ necessary for the recording is:

$$I_{min} \leq \left\{ 1 + \left(\frac{(NA)^2}{0.17 \, \pi \lambda}\right)^2 Z^2 \right\} - 1$$

$$1 + \left(\frac{(NA)^2}{0.17 \, \pi \lambda}\right)^2 Z^2 \leq 1/I_{min}$$

$$\left(\frac{(NA)^2}{0.17 \, \pi \lambda}\right)^2 Z^2 \leq 1/I_{min} - 1$$

$$|Z| \leq \frac{0.17 \, \pi \lambda}{(NA)^2} \sqrt{1/I_{min} - 1}$$

Substitution of $\alpha = 0.83$ $\mu$m, NA=0.6 and $I_{min} = 0.7$ yields:

$$|Z| = \leq \frac{0.44}{0.36} \sqrt{0.4286} = \frac{0.44}{0.36} \times 0.65 = 0.79 \, \mu m$$

Also, substitution of $\lambda = 0.83$ μm, $NA = 0.5$ and $I_{min} = 0.7$ yields:

$$|Z| \leq \frac{0.44 \times 0.65}{0.25} = 1.16 \, \mu m$$

The values of λ and NA may be varied in some ranges which are centered on the values noted above. In view of the way of setting $I_{min}$, a criterion of the permissible defocus is ±2.0 μm. Thus, for the optical disk the value of Δx may be determined such that the defocusing is held within the permissible defocusing noted above, and accordingly, the materials and shapes of the frame 74 and lens-barrel 76 may be determined.

More specifically, since the semiconductor laser 30 and surface of the recording film (i.e., light-reflecting layer 14) are in an image focusing relation to each other, a displacement d of the semiconductor layer 30 corresponding to defocusing value δ on the recording film surface is d=Mδ, where M is the longitudinal magnification. Since the permissible defocusing is ±2.0 μm, as noted above, the permissible deviation of the semiconductor laser 30 with respect to the front point of the collimator lens system, consisting of the collimator lenses 32 and 34, is ±2×M. Thus, the deviation of the semiconductor laser 30 is restricted such that the change Δx in the distance between the semiconductor laser 30 and the front principle point of the collimator lens system with temperature changes is held within the afore-mentioned tolerance. That is, the parameters may be determined as:

$$|(B \times \gamma - A0 \times \beta) \times \Delta t| \leq M\delta \quad (6),$$

$$|(B \times \gamma - A1 \times \beta) \times \Delta t| \leq M\delta \quad (7),$$

or $$|\gamma C \times \Delta t| \leq M\delta \quad (8),$$

where δ=2.0 μm.

The temperature usually changes in a range of 0° to 40° C., that is, Δt=20° C. with respect to normal temperature. Hence, the parameters may be determined as:

$$|(B \times \gamma - A0 \times \beta)| \leq M\delta/|\Delta t| \quad (10),$$

$$|(B \times \gamma - A1 \times \beta)| \leq M\delta/|\Delta t| \quad (11),$$

or $$|\gamma C| \leq M\delta/|\Delta t| \quad (12),$$

where δ=2.0 μm and $|\Delta t|$ =20.

Figure 7:
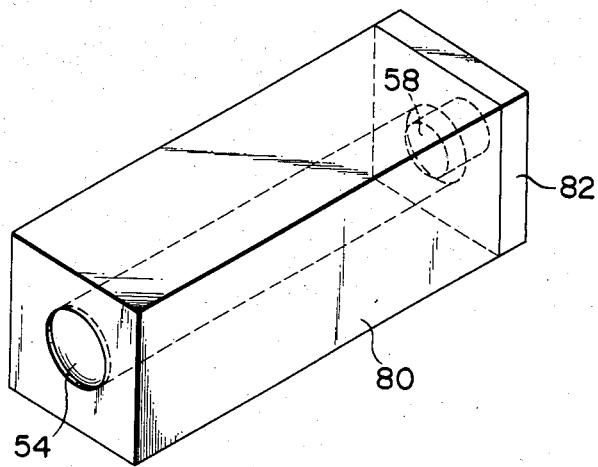
FIG. 7 is a fragmentary perspective view showing a structure for supporting a projecting lens system.

Now, the deviation of the projecting lens 54 in the optical system for detecting the defocusing state caused by temperature changes, will be discussed. In the focus detecting optical system, as shown in FIG. 7, the light detector 58 is secured to a base 38 like the collimator lens system, and the base 82 is secured to a lens-barrel 80, to which the projecting lens 54 is secured. Like the collimator lens system, a temperature change will cause thermal expansion or contraction of the lens-barrel 80, thus causing a deviation of the projecting lens 54. Consequently, misjudging the focused state for a defocusing state or vice versa is liable to occur in the focus detecting system. This misjudgement, however, can be eliminated if the deviation of the collimator lens system is cancelled by the deviation of the projecting lens 54.

Figure 8:
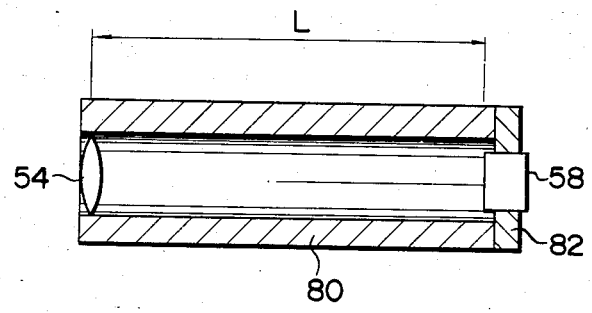
FIG. 8 is a sectional view showing the structure shown in FIG. 7.

The deviation of the projecting lens 54 will now be considered. Denoting the distance between the rear principle point of the projecting lens 54 and light detector 58 by L, as shown in FIG. 8, and the change in the distance L due to a temperature change by Δt by ΔL, this change ΔL, which is due to thermal expansion or contraction, is given as:

$$\Delta L = \chi L \Delta t \quad (13),$$

where X is the linear expansion coefficient of the lens-barrel 80.

The defocusing value δ1 and δ2 with respect to the deviation ΔL of the projecting lens 54 and the deviation ΔX of the collimator lens system, respectively, which are positive in the direction in which the optical disk goes away from the projecting lens 40, are given as:

$$\delta 1 = (f0/f1)^2 \Delta X = (f0/f1)^2 (B \times \gamma - A0 \times \beta) \times \Delta t \quad (14),$$

and $$\delta 2 = (f0/f2)^2 \Delta L = (f0/f2)^2 \chi L \Delta t \quad (15),$$

where f1 is the focal distance of the collimator lens system, including of the collimator lenses 32 and 34, and f2 is the focal distance of the objective lens 40. The equations 14 and 15 hold because the semiconductor laser 30 and optical disk 2 in the projecting lens system for projecting a laser beam onto the light-reflecting surface of the optical disk 2 are in an image focusing relation to each other, and the light-reflecting surface of the optical disk 2 and light detector 58 in the focus detection system for detecting the focus from the laser beam reflected by the light-reflecting surface of the optical disk 2 are in an image focusing relation to each other.

The defocusing value δ2 is based on the absence of focus servo, and in the presence of the focus servo action, the polality of the defocusing value δ2 is reversed. The total defocusing value is thus given as:

$$\delta = \delta 1 - \delta 2 \quad (16)$$

$$= \{(f0/f1)^2(B \times \gamma - A0 \times \beta) - (f0/f2)^2 \chi L\} \Delta t$$

In order for δ to be sufficiently small, it is necessary to satisfy a condition:

$$(B \times \gamma - A0 \times \beta) \times \chi L > 0 \quad (17).$$

So long as this condition is satisfied, the defocusing value δ1 and δ2, corresponding to the deviation ΔL of the projecting lens 54 and deviation Δx of the collimator lens system, respectively, cancel each other.

Since the defocusing value δ due to the deviation of the projecting lens 54 and deviation of the collimator lens system is required to be less than the permissible defocusing value d, there holds a similar equation:

$$|\{(f0/f1)^2(B + \gamma - A0 \times \beta) - (f0/f2)^2 \chi L\} \Delta t| \leq d \quad (18).$$

where d=2.0 μm.

Since the temperature usually changes in a range of 0° to 40° C., that is, Δt=20° C., with respect to normal temperature:

$$|\{(f0/f1)^2(B \times \gamma - A0 \times \beta) - (f0/f2)^2 \chi L\}| \leq d/\Delta t \quad (19).$$

where $d = 2.0$ μm and $|\Delta t| = 20$.

Preferably, following equation is established:

$$(f_0/f_1)^2(B \times \gamma - A_0 \times \beta) = (f_0/f_2)^2 \chi L \qquad (20).$$

The materials and shapes of the base 72, frame 74 and lens-barrel 76 and 80 are selected to satisfy the above conditions.

As has been shown, according to the invention, it is possible to select the materials and shapes of the base 72, frame 74 and lens-barrel 76 and 80 on the basis of the total defocusing value $\delta$, which is the sum of the absolute value of the defocusing value $\delta_1$ due to the deviation $\Delta L$ of the projecting lens 54 and the absolute value of the defocusing value $\delta_2$ due to the deviation $\Delta X$ of the collimator lens system instead of the defocusing value $\delta$ which corresponds to the difference between the defocusing value $\delta_1$ and $\delta_2$ noted above. The total defocusing value $\delta$ as the sum of the absolute values of the defocusing value $\delta_1$ and $\delta_2$ is given as:

$$\delta = |\delta_1| + |\delta_2| \qquad (21)$$
$$= \{|(f_0/f_1)^2(B \times \gamma - A_0 \times \beta)| + |(f_0/f_2)^2 \chi L|\} \Delta t.$$

Likewise, since the defocusing value $\delta$ due to the deviation of the projecting lens 54 and deviation of the collimator lens system is required to be less than the permissible defocusing value d, there holds the relation:

$$\{|(f_0/f_1)^2(B \times \gamma - A_0 \times \beta)| + |(f_0/f_2)^2 \chi L|\} \Delta t \leq d \qquad (22),$$

where $\delta = 2.0$ μm.

Since the temperature usually changes in a range of 0° to 40° C., that is, $\Delta t = 20°$ C., with respect to normal temperature:

$$|(f_0/f_1)^2(B \times \gamma - A_0 \times \beta)| + |(f_0/f_2)^2 \chi L| \leq d/\Delta t \qquad (23),$$

where $\delta = 2.0$ μm and $|\Delta t| = 20$. The materials and shapes of the base 72, frame 74 and lens-barrel 76 and 80 are selected to satisfy the above conditions.

The above concept of selecting the materials and shapes of the base 72, frame 74 and lens-barrel 76 and 80 so as to hold the defocusing value caused by deviation of the projecting lens 54 and deviation of the collimating lens system, within the permissible defocusing value, is applicable not only to the focus detecting system as described above but also to other focus detecting systems such as an astigmatic system.

Further, the focus detection system is not limited to the so-called knife edge type, but it is possible to adopt various other focus detecting systems.

What is claimed is:

1. An optical head comprising a beam source for generating a light beam, a base supporting said beam source mounted thereon and having a linear expansion coefficient $\alpha$, a frame supporting said base secured thereto and having a linear expansion coefficient $\gamma$, a lens-barrel disposed in and secured to said frame and having a linear expansion coefficient $\beta$, and a collimator lens system disposed in and secured to said lens-barrel for collimating the light beam generated from said beam source, said frame being made of a material having a linear expansion coefficient satisfying either one of the inequalities $\alpha \geq \gamma$ and $\beta \geq \gamma$.

2. The optical head according to claim 1, wherein said base, lens-barrel and frame are made of materials having linear expansion coefficients satisfying either one of inequalities $\alpha \geq \gamma \geq \beta$ and $\beta > \gamma > \alpha$.

3. The optical head according to claim 1, wherein said base and frame are made of the same material.

4. The optical head according to claim 1, which further comprises a member for securing said lens-barrel to said frame by point contact securement.

5. The optical head according to claim 1, wherein said collimator lens system includes at least one collimator lens, an outer periphery portion of said lens-barrel corresponding to the outer periphery of said collimator lens being secured to said frame.

6. The optical head according to claim 1, wherein the materials of said frame and said lens-barrel are selected such that $$B \times \gamma - A_0 \times \beta$$

is substantially zero, where $A_0$ represents the distance from the secured point of said lens-barrel to the front principle point of said collimator lens system, and B represents the distance from said secured point of lens-barrel to said beam source.

7. The optical head according to claim 1, wherein the materials of said frame and said lens-barrel are selected such that $$B \times \gamma - A_1 \times \beta$$

is substantially zero, where $A_1$ represents the distance from the secured point of said lens-barrel to a collimator lens in said collimator lens system, and B represents the distance from said secured point of lens-barrel to said beam source.

8. An optical head comprising a beam source for generating a light beam, a base supporting said beam source mounted thereon and having a linear expansion coefficient $\alpha$, a frame secured to said base and having a linear expansion coefficient $\gamma$, a lens-barrel disposed in and secured to said frame and having a linear expansion coefficient $\beta$, a collimator lens system disposed in and secured to said frame for collimating the light beam generated from said beam source and an objective lens for converging the collimated light beam to form a beam spot on a light-reflecting surface, said beam source and light-reflecting surface being held in an image focusing relation to each other by an optical system provided between said beam source and light-reflecting surface, said frame being made of a material having a linear expansion coefficient satisfying either one of the inequalities $\alpha \geq \gamma$ and $\beta > \gamma$.

9. The optical head according to claim 8, wherein said base, lens-barrel and frame are made of materials having linear expansion coefficients satisfying either one of the inequalities $\alpha \geq \gamma \geq \beta$ and $\beta > \gamma > \alpha$.

10. The optical head according to claim 8, wherein said base and frame are made of the same material.

11. The optical head according to claim 8, which further comprises a member for securing said lens-barrel to said frame by point contact securement.

12. The optical head according to claim 8, wherein said collimator lens system includes at least one collimator lens, an outer periphery portion of said lens-barrel corresponding to the outer periphery of said collimator lens being secured to said frame.

13. The optical head according to claim 8, wherein the materials of said frame and lens-barrel are selected such that $$B \times \gamma - A0 \times \beta$$

is substantially zero, where A0 represents the distance from the secured point of said lens-barrel to the front principle point of said collimator lens system, and B represents the distance from said secured point of said lens-barrel to said beam source.

14. The optical head according to claim 8, wherein the materials of said frame and lens-barrel are selected such that $$B \times \gamma - A1 \times \beta$$

is substantially zero, where A1 represents the distance from the secured point of said lens-barrel to a collimator lens in said collimator lens system, and B represents the distance from said secured point of the lens-barrel to said beam source.

15. The optical head according to claim 8, wherein said lens-barrel and frame are made of materials satisfying a condition:
$$|(B \times \gamma - A0 \times \beta)| \leq M\delta/|\Delta t|$$

where M represents a longitudinal magnification determined by the optical system provided between said beam source and light-reflecting surface, A0 represents the distance from the secured point of said lens-barrel to the front principle point of said collimator lens system, B represents the distance from said secured point of the lens-barrel to said beam source, $\delta$ represents the permissible defocusing value in the objective lens and is 2.0 $\mu$m, and $|\Delta t|$ represents the absolute value of the temperature change from the normal temperature and is 20.

16. The optical head according to claim 8, wherein said lens-barrel and frame are made of materials satisfying a condition:

$$|(B \times \gamma - A1 \times \beta)| \leq M\delta/|\Delta t|$$

where M represents a longitudinal magnification determined by the optical system provided between said beam source and light-reflecting surface, A1 represents the distance from the secured point of said lens-barrel to a collimator lens in said collimator lens system, B represents the distance from said secured point of the lens-barrel to said beam source, $\delta$ represents the permissible defocusing value in the objective lens and is 2.0 $\mu$m, and $|\Delta t|$ represents the absolute value of the temperature change from the normal temperature and is 20.

17. The optical head according to claim 8, wherein said collimator lens system includes at least one collimator lens, an outer periphery portion of said lens-barrel corresponding to the outer periphery of said collimator lens being secured to said frame, the materials of said frame and lens-barrel being made of materials satisfying a condition:

$$|C \times \gamma| \leq M\delta/|\Delta t|$$

where M represents a longitudinal magnification determined by the optical system provided between said beam source and light-reflecting surface, C the distance from the secured point of said lens-barrel to said beam source, $\delta$ represents the permissible defocusing value in the objective lens and is 2.0 $\mu$m, and $|\Delta t|$ represents the absolute value of the temperature change from the normal temperature and is 20.

18. An optical head comprising a beam source for generating a light beam, a first base supporting said beam source mounted thereon and having a linear expansion coefficient $\alpha$, a frame supporting said first base secured thereto and having a linear expansion coefficient $\gamma$, a first lens-barrel disposed in and secured to said frame and having a linear expansion coefficient $\beta$, a collimator lens system secured to said first lens-barrel and having a focal distance f1 for collimating the light beam generated from said beam source, an objective lens having a focal distance f0 for converging the collimated light beam to form a beam spot on a light-reflecting surface, a projecting lens having a focal distance f2 for transferring the light beam reflected from the light reflecting surface, a light detector for detecting a defocusing by detecting the light beam from said projecting lens, and a second base supporting said light detector mounted thereon, a second lens barrel secured to said second base and accommodating said light detector and projecting lens mutually faced to each other and having a fixed linear expansion coefficient X, said second lens-barrel being made of a material permitting cancellation of the defocusing caused by thermal deformation of said frame and first lens-barrel of the defocusing caused by thermal deformation of said second lens-barrel.

19. The optical head according to claim 18, wherein the materials and shapes of said first base, frame and first and second lens-barrels are selected to meet a condition:

$$(B \times \gamma - A0 \times \beta) \times \chi L > 0$$

where A0 represents the distance from the secured point of the lens-barrel to the front principle point of said collimator lens system, B represents the distance from said secured point of the lens-barrel to said beam source, and L represents the distance between said projecting lens and light detector.

20. The optical head according to claim 18, wherein the materials and shapes of said first base, frame and first and second lens-barrels are selected to meet a condition:

$$|\{(f0/f1)^2(B \times \gamma - A0 \times \beta) - (f0/f2)^2 \chi L\}| \leq d/\Delta t$$

where A0 represents the distance from the secured point of the lens-barrel to the front principle point of said collimator lens system, B represents the distance from said secured point of the lens-barrel to said beam source, L is the distance between said projecting lens and light detector, d represents the permissible defocusing value in said objective lens and is 2.0 $\mu$m, and $|\Delta t|$ is the absolute value of the temperature change from the normal temperature and is 20.

21. The optical head according to claim 18, wherein the materials and shapes of said first base, frame and first and second lens-barrels are selected to meet a condition:

$$(f0/f1)^2(B \times \gamma - A0 \times \beta) = (f0/f2) \chi L$$

22. The optical head according to claim 18, wherein the materials and shapes of said first base, frame and first and second lens-barrels are selected to meet a condition:

$$|(f0/f1)^2(B \times \gamma - A0 \times \beta)| + |(f0/f2)^2 \chi L| \leq d/\Delta t$$

where A0 is the distance from the secured point of the lens-barrel to the front principle point of said collimator lens system, B represents the distance from said secured point of lens-barrel to said beam source, L is the distance between said projecting lens and light detector, d represents the permissible defocusing value in said objective lens and is 2.0 $\mu$m, and $|\Delta t|$ is the absolute value of the temperature change form the normal temperature and is 20.

* * * * *